United States Patent
Ko

(10) Patent No.: US 6,807,957 B2
(45) Date of Patent: Oct. 26, 2004

(54) ENGINE BLOW-BY GAS DISTRIBUTION SYSTEM

(75) Inventor: Gab-Seok Ko, Anyang (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/447,412

(22) Filed: May 28, 2003

(65) Prior Publication Data

US 2003/0230291 A1 Dec. 18, 2003

(30) Foreign Application Priority Data

Jun. 12, 2002 (KR) .................................. 10-2002-32875

(51) Int. Cl.$^7$ ............................................. F02M 25/07
(52) U.S. Cl. .................................. 123/572; 123/184.21
(58) Field of Search ............................. 123/572–574, 123/184.21–184.61

(56) References Cited

U.S. PATENT DOCUMENTS

| | | | | |
|---|---|---|---|---|
| 4,517,951 A | | 5/1985 | Otaka et al. | |
| 5,209,191 A | * | 5/1993 | Kopec | 123/184.45 |
| 5,488,939 A | * | 2/1996 | Nakai et al. | 123/572 |
| 5,660,155 A | * | 8/1997 | Taue et al. | 123/184.54 |
| 6,192,848 B1 | * | 2/2001 | Hada et al. | 123/184.24 |

FOREIGN PATENT DOCUMENTS

JP          2000-198511          6/2000

* cited by examiner

Primary Examiner—Marguerite McMahon
(74) Attorney, Agent, or Firm—Morgan Lewis & Bockius LLP

(57) ABSTRACT

The distribution system includes an intake manifold configured to supply intake air to each cylinder of an engine; and a blow-by gas passageway formed within the intake manifold. The blow-by gas passageway is configured to uniformly distribute blow-by gas, which is received through a blow-by gas return path, to each cylinder through the intake manifold.

18 Claims, 3 Drawing Sheets

ENGINE BLOW-BY GAS DISTRIBUTION SYSTEM

FIELD OF THE INVENTION

The present invention relates to an engine, and more particularly, to a distribution system for blow-by gas of an engine.

BACKGROUND OF THE INVENTION

Engine blow-by gas refers to all the gasses that are not exhausted through the exhaust manifold. Blow-by gas consists of combustion gasses that bypass the piston rings and enter the crankcase during engine operation. If the crankcase is not vented, this blow-by gas causes a build-up of pressure in the crankcase, resulting in damage to engine seals and environmental pollution through oil leaks and the escape of the blow-by gas and atomized lubricants to the atmosphere.

For these reasons, many methods are used to remove blow-by gas. In the most common method, a PCV (positive crankcase ventilation) valve is opened when the pressure in the crankcase reaches a predetermined level. With the opening of the PCV valve, the blow-by gas enters the intake manifold to be supplied to the combustion chamber together with new intake air.

There are two main considerations when installing a blow-by gas distribution system. The first is concerned with distribution, while the second is concerned with layout. Since blow-by gas is a type of impurity, many negative effects result if it is supplied together with new air into the combustion chamber. In particular, combustion is negatively affected, and if a uniform amount of blow-by gas does not enter each cylinder, a difference in the combustive pressures results such that performance deteriorates and NVH (noise, vibration, & harshness) is significantly increased. Accordingly, it is necessary to optimize an installation location or pathway of a PCV valve 120, as well as where the blow-by gas enters an intake manifold 100.

With respect to layout, the blow-by gas distribution system often interferes with other elements. In fact, interaction between the blow-by gas distribution system and other mechanisms may wear away protective coverings, etc. as a result of vibration.

SUMMARY OF THE INVENTION

The blow-by gas distribution system of the present invention is preferably capable of equally distributing blow-by gas to each cylinder. In a preferred embodiment of the present invention, the blow-by gas distribution system comprises an intake manifold, and a blow-by gas passageway. The intake manifold is configured to supply intake air to each cylinder of an engine. The blow-by gas passageway is formed within the intake manifold, and the blow-by gas passageway is configured to uniformly distribute blow-by gas to each cylinder, through the intake manifold.

Preferably, the intake manifold comprises a plenum cap shell, a runner shell, and a center shell. The plenum cap shell is fastened to one side of an engine throttle body, and the plenum cap shell is filled with air supplied from the throttle body. The runner shell is mounted between the plenum cap shell and intake holes of each cylinder of the engine, and is configured to supply intake air supplied to the plenum cap shell to each cylinder. The center shell is mounted between the plenum cap shell and the runner shell, and is configured to guide the intake air filled in the plenum cap shell to the runner shell.

It is preferable that the plenum cap shell is pan-shaped with a predetermined depth, and is separated into two spaces by a partitioning wall.

It is further preferable that the two spaces of the plenum cap shell comprise a filling space, and a supply space. Air supplied from outside the intake manifold is filled into the filling space. The supply space is communicated with the center shell to supply air received from the center shell.

Preferably, the communication of the filling space and the supply space is realized by an aperture formed in the partitioning wall, intake air supplied through the aperture being supplied to the runner shell via the center shell.

It is preferable that the runner shell is realized through a shape in which each of the intake runners is curved, one end of the runner shell being connected to a cylinder head, which is adjacent to a cylinder head cover, and its other end being connected to the center shell.

Preferably, the center shell includes holes, which are formed at a location corresponding to the intake runners of the runner shell at an area adjacent to the runner shell.

It is preferable that the holes of the center shell comprise first holes, and second holes. The first holes contact one end of the runner shell and receive the intake air filled in the plenum cap shell. The second holes contact between another end of the runner shell and intake holes of each cylinder of the engine, the second holes act to exhaust the intake air supplied through the runner shell.

It is further preferable that the blow-by gas passageway comprises first blow-by channel and a second blow-by channel. The first blow-by channel is formed in the center shell and connected to each of the intake runners formed in the runner shell. The second blow-by channel is at a location of the plenum cap shell corresponding to the first blow-by channel such that the blow-bay gas passageway is realized through the combination of the first blow-by channel and the second blow-by channel.

Preferably, the blow-by gas passageway is formed such that its one end is closed while its other end is formed into a blow-by intake pipe that connects to a blow-by gas return hose and protrudes from the intake manifold.

It is further preferable that passage holes are formed in the blow-by gas passageway, and the passage holes communicate with the intake runners formed in the runner shell.

It is preferable that the blow-by gas passageway is connected to a blow-by intake pipe that connects to a blow-by gas return hose, and the blow-by intake pipe is integrally formed with the intake manifold.

In another preferred embodiment of the present invention, the blow-by gas distribution system for an engine comprises an intake manifold and a blow-by gas passageway. The intake manifold is configured to supply intake air to each cylinder of said engine, and is provided with a plurality of intake runners defining air paths communicating with said cylinder of said engine. The blow-by gas passageway is formed within said intake manifold, and is configured to supply blow-by gas to each air path of intake runners of said intake manifold through passage holes. Each air path communicates with said blow-by gas passageway through each passage hole.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings. A blow-by gas distribution system for an engine according to a preferred embodiment of the present invention will be described with reference to FIGS. 1–3.

Figure 1:
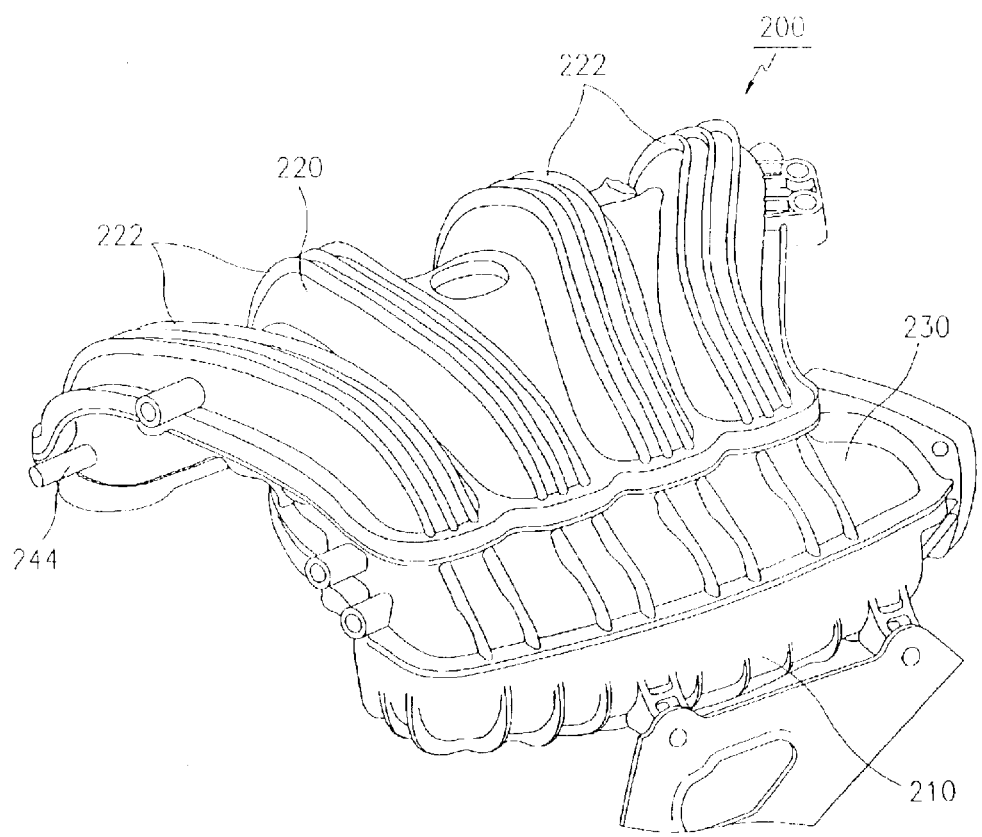
FIG. 1 is a schematic perspective view of a blow-by gas distribution system according to a preferred embodiment of the present invention.
Figure 2:
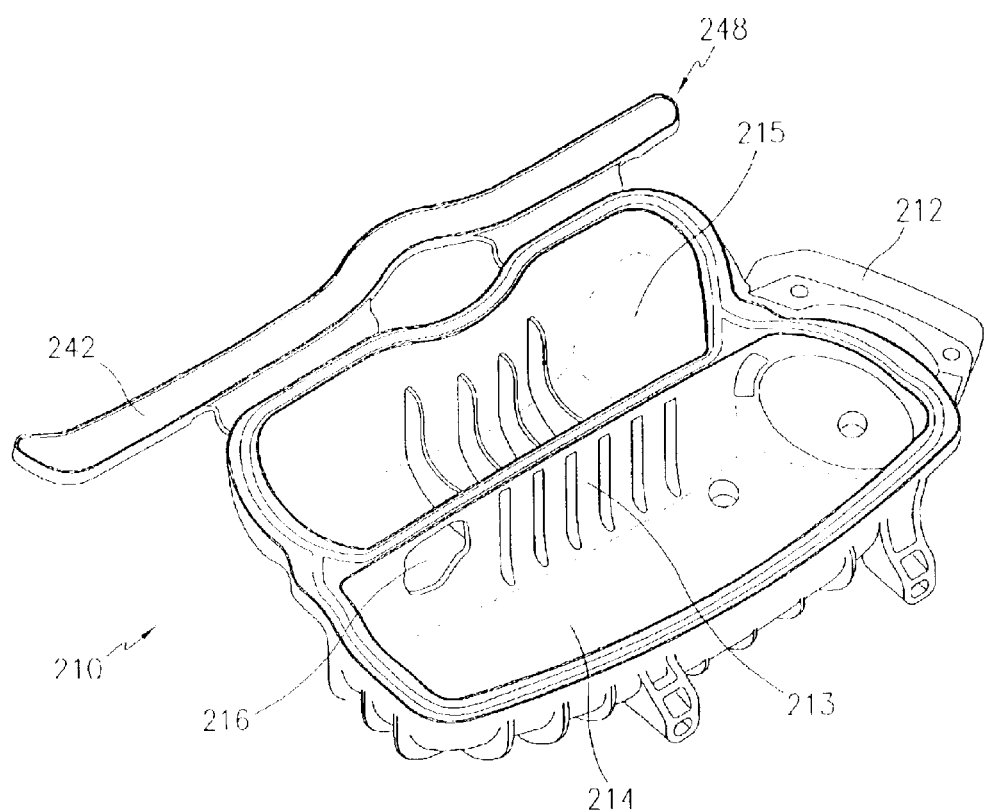
FIG. 2 is a schematic perspective view of a plenum cap shell of FIG. 1.

A blow-by gas distribution system according to a preferred embodiment of the present invention includes a plastic intake manifold 200, and a blow-by gas passageway 248 (FIG. 2). The intake manifold 200 has the shape shown in FIG. 1, and acts to receive external air and supply it to each cylinder of the engine.

The intake manifold 200 includes a plurality of intake runners 222, which form air intake paths. In use, air passes through a throttle body, then through the air intake paths of the intake runners 222 for transmission to a combustion chamber of the engine.

The blow-by gas passageway 248 is formed within the intake manifold 200 to evenly distribute blow-by gas, which enters via a blow-by gas return path, to each cylinder through the intake manifold 200. The blow-by gas passageway 248 is preferably connected to a PCV valve (not shown) by a blow-by gas return hose (not shown).

The intake manifold 200 is structured using three different elements of a plenum cap shell 210, a runner shell 220, and a center shell 230. The plenum cap shell 210 is fastened to a part of an engine throttle body 212. The plenum cap shell 210 is filled with air supplied from the throttle body. Further, the plenum cap shell 210 is made of plastic, and is pan-shaped with a predetermined depth.

As shown in FIG. 2, the plenum cap shell 210 is separated into two spaces by a partitioning wall 213. The two spaces include a filling space 214 into which air supplied from outside the intake manifold 200 is filled, and a supply space 215 communicated with the center shell 230 to supply air received from the throttle body 212 to the cylinders. The communication of the filling space 214 and the supply space 215 is realized by an aperture 216 formed in the partitioning wall 213. Intake air supplied through the aperture 216 formed in the partitioning wall 213 is supplied to the runner shell 220 via the center shell 230.

The runner shell 220 is mounted between the plenum cap shell 210 and intake ports of each cylinder of the engine, and acts to supply intake air supplied to the plenum cap shell 210 to each cylinder during intake strokes of the engine.

The runner shell 220 is realized through a shape as shown in FIG. 1 in which each of the intake runners 222 (a total of four for a 4-cylinder engine) is curved, one end of the runner shell 220 being connected to a cylinder head, which is adjacent to a cylinder head cover, and its other end being connected to the center shell 230.

The center shell 230 is mounted between the plenum cap shell 210 and the runner shell 220, and acts to guide the intake air filled in the plenum cap shell 210 to the runner shell 220.

Figure 3:
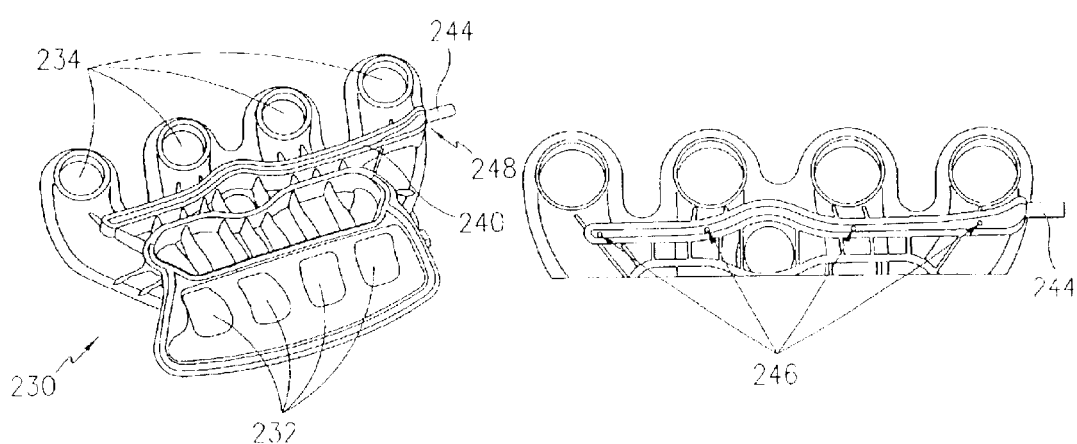
FIG. 3 is a schematic perspective view of a center shell of FIG. 1.

As shown in FIG. 3, first and second holes 232 and 234 are formed in the center shell 230. The number of each of the first and second holes 232 and 234 corresponds to the number of cylinders (for example, four of each of the first and second holes 232 and 234 for a 4-cylinder engine).

The first holes 232 contact one end of the runner shell 220 and receive the intake air filled in the plenum cap shell 210. The second holes 234 are contacted between another end of the runner shell 220 and intake holes of each cylinder of the engine, and act to exhaust the intake air supplied through the runner shell 220.

The blow-by gas passageway 248 is realized through the combination of a first blow-by channel 240, which is formed in the center shell 230 and connected to each of the intake runners 222 forming the runner shell 220, and a second blow-by channel 242 formed on a surface of the plenum cap shell 210 contacting the center shell 230 and at a location corresponding to the first blow-by channel 240.

With reference to FIGS. 2 and 3, the blow-by gas passageway 248 is realized by the joining of the center shell 230 and the plenum cap shell 210. The blow-by gas passageway 248 is long and has a small diameter, with one end of the blow-by gas passageway 248 being closed while its other end is formed to a blow-by intake pipe 244 that contacts a blow-by pipe. The blow-by intake pipe 244 is formed protruding from the intake manifold 200 as shown in FIGS. 1 and 3.

In the preferred embodiment of the present invention, the intake manifold 200 is made of plastic rather than the typical material of aluminum, and instead of a nipple, the blow-by intake pipe 244 is integrally formed to the intake manifold 200. As a result, a structure that connects each port to allow for closer proximity to the cylinder head cover is realized.

With such a configuration, a length of a blow-by hose is minimized to allow for a simple peripheral layout. Also, the formation or size of the holes may be varied as needed to enhance the distribution of the blow-by gas entering each cylinder.

Further, passage holes 246 are formed in the blow-by gas channel 240 as shown in FIG. 3, communicating with the air intake paths of the intake runners 222. Further, the passage holes 246 are formed to allow for the uniform intake of blow-by gas into each cylinder. A size and direction of the passage holes 246 may be varied according to the formation of the intake manifold 200 and depending on engine characteristics. For example, the passage holes 246 may be formed such that those close to the intake ports are small, and those further away become increasingly larger as the distance to the intake ports becomes greater.

In the intake manifold 200 of the preferred embodiment of the present invention structured as in the above, blow-by gas entering into the blow-by gas passageway 248 from the blow-by intake pipe is supplied uniformly to each cylinder through the intake runners 222 after passing through the passage holes 246, to thereby improve the intake efficiency of all of the cylinders. Further, since the blow-by gas passageway is formed by a combination of the first blow-by channel 240 and the second blow-by channel 242 of the plenum cap shell 210, only a small portion of the blow-by gas pathway, the blow-by-intake pipe 244, is protruded from a side of the plenum cap shell 210 to thereby prevent any mechanical interference with external elements. Accordingly, the uniform distribution of blow-by gas supplied to the runner shell 220 is possible.

In the distribution system for engine blow-by gas of the present invention, the distribution of blow-by gas to each cylinder is optimized such that engine performance is improved and NVH is minimized. Also, the layout of the blow-by gas distribution system is simplified. In addition, the nipple configuration used in conventional systems is omitted to thereby reduce costs associated with this element.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A blow-by gas distribution system for an engine having an intake manifold configured to supply intake air to each cylinder of an engine, wherein the intake manifold comprises:

a plenum cap shell fastened to one side of an engine throttle body, the plenum cap shell being filled with air supplied from the throttle body;

a runner shell mounted between the plenum cap shell and intake holes of each cylinder of the engine, and configured to supply intake air supplied to the plenum cap shell to each cylinder;

a center shell mounted between the plenum cap shell and the runner shell, and configured to guide the intake air filled in the plenum cap shell to the runner shell; and a blow-by gas passageway formed within the intake manifold, the blow-by gas passageway configured to uniformly distribute blow-by gas to each cylinder, through the intake manifold.

2. The blow-by gas distribution system of claim 1, wherein the plenum cap shell is pan-shaped with a predetermined depth, and is separated into two spaces by a partitioning wall.

3. The blow-by gas distribution system of claim 2, wherein the two spaces comprise:

a filling space into which air supplied from outside the intake manifold is filled; and a supply space communicated with the center shell to supply air received from the center shell.

4. The blow-by gas distribution system of claim 2, wherein the communication of the filling space and the supply space is realized by an aperture formed in the partitioning wall, intake air supplied through the aperture being supplied to the runner shell via the center shell.

5. The blow-by gas distribution system of claim 1, wherein the runner shell is realized through a shape in which each of the intake runners is curved, one end of the runner shell being connected to a cylinder head, which is adjacent to a cylinder head cover, and its other end being connected to the center shell.

6. The blow-by gas distribution system of claim 1, wherein the center shell includes holes, which are formed at a location corresponding to the intake runners of the runner shell at an area adjacent to the runner shell.

7. The blow-by gas distribution system of claim 1, wherein the holes comprise:

first holes contacting one end of the runner shell and receiving the intake air filled in the plenum cap shell; and second holes contacting another end of the runner shell with intake holes of each cylinder of the engine, the second holes acting to exhaust the intake air supplied through the runner shell.

8. The blow-by gas distribution system of claim 1, wherein the blow-by gas passageway comprises:

a first blow-by channel formed in the center shell and connected to each intake runner formed in the runner shell; and a second blow-by channel at a location of the plenum cap shell corresponding to the first blow-by channel such that the blow-by gas passageway is realized through the combination of the first blow-by channel and the second blow-by channel.

9. The blow-by gas distribution system of claim 8, wherein the blow-by gas passageway is formed such that its one end is closed while its other end is formed into a blow-by intake pipe that connects to a blow-by gas return hose and protrudes from the intake manifold.

10. The blow-by gas distribution system of claim 8, wherein passage holes are formed in the blow-by gas passageway, the passage holes communicating with the intake runners formed in the runner shell.

11. The blow-by gas distribution system of claim 1, wherein the blow-by gas passageway is connected to a blow-by intake pipe that connects to a blow-by gas return hose, and the blow-by intake pipe is integrally formed with the intake manifold.

12. A blow-by gas distribution system for an engine having an intake manifold configured to supply intake air to each cylinder of an engine, the intake manifold provided with a plurality of intake runners defining air paths communicating with the cylinder of said the engine, wherein the intake manifold comprises:

a plenum cap shell fastened to one side of an engine throttle body, the plenum cap shell being filled with air supplied from the throttle body;

a runner shell mounted between the plenum cap shell and intake holes of each cylinder of the engine, and configured to supply intake air supplied to the plenum cap shell to each cylinder;

a center shell mounted between the plenum cap shell and the runner shell, and configured to guide the intake air filled in the plenum cap shell to the runner shell; and a blow-by gas passageway formed within said intake manifold, said blow-by gas passageway configured to supply blow-by gas to each air path of intake runners of said intake manifold through passage holes, wherein each air path communicates with said blow-by gas passageway through each passage hole.

13. The blow-by gas distribution system of claim 12, wherein the plenum cap shell is pan-shaped with a predetermined depth, and is separated into two spaces by a partitioning wall.

14. The blow-by gas distribution system of claim 13, wherein the two spaces comprise:

a filling space into which air supplied from outside the intake manifold is filled; and a supply space communicated with the center shell to supply air received from the center shell.

15. The blow-by gas distribution system of claim 13, wherein the communication of the filling space and the supply space is realized by an aperture formed in the partitioning wall, intake air supplied through the aperture being supplied to the runner shell via the center shell.

16. The blow-by gas distribution system of claim 12, wherein the runner shell is realized through a shape in which each of the intake runners is curved, one end of the runner shell being connected to a cylinder head, which is adjacent to a cylinder head cover, and its other end being connected to the center shell.

17. The blow-by gas distribution system of claim 12, wherein the center shell includes holes, which are formed at a location corresponding to the intake runners of the runner shell at an area adjacent to the runner shell.

18. The blow-by gas distribution system of claim 17, wherein the holes comprise:

first holes contacting one end of the runner shell and receiving the intake air filled in the plenum cap shell; and second holes contacted between contacting another end of the runner shell with intake holes of each cylinder of the engine, the second holes acting to exhaust the intake air supplied through the runner shell.

* * * * *